US008645044B2

(12) United States Patent
Wermuth et al.

(10) Patent No.: US 8,645,044 B2
(45) Date of Patent: Feb. 4, 2014

(54) METHOD AND APPARATUS FOR OPERATING AN INTERNAL COMBUSTION ENGINE IN A HOMOGENEOUS-CHARGE COMPRESSION-IGNITION COMBUSTION MODE

(75) Inventors: Nicole Wermuth, Garching Bei München (DE); Paul M. Najt, Bloomfield Hills, MI (US); Orgun A. Guralp, Ann Arbor, MI (US); Hanho Yun, Oakland Township, MI (US); Jun-Mo Kang, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 265 days.

(21) Appl. No.: 13/094,913

(22) Filed: Apr. 27, 2011

(65) Prior Publication Data

US 2011/0288747 A1 Nov. 24, 2011

Related U.S. Application Data

(60) Provisional application No. 61/347,799, filed on May 24, 2010.

(51) Int. Cl.
*G06F 17/00* (2006.01)
(52) U.S. Cl.
USPC .............................. 701/103; 123/435; 123/305
(58) Field of Classification Search
USPC .................. 123/90.15–90.18, 294, 295, 305, 123/406.41–406.43, 435; 701/103, 105
See application file for complete search history.

(56) References Cited

U.S. PATENT DOCUMENTS

| 7,128,047 | B2 | 10/2006 | Kuo et al. | |
|---|---|---|---|---|
| 7,152,559 | B2 | 12/2006 | Kuo et al. | |
| 7,228,839 | B2 | 6/2007 | Kuo et al. | |
| 7,246,597 | B2 * | 7/2007 | Kuo et al. | 123/305 |
| 7,367,308 | B2 | 5/2008 | Kuo et al. | |
| 7,370,633 | B2 | 5/2008 | Kang et al. | |
| 7,409,285 | B2 * | 8/2008 | Kang et al. | 701/115 |
| 7,509,932 | B2 * | 3/2009 | Hara et al. | 123/90.15 |
| 7,637,251 | B2 * | 12/2009 | Kuo et al. | 123/435 |
| 7,802,553 | B2 | 9/2010 | Najt et al. | |
| 8,267,065 | B2 * | 9/2012 | Kurtz et al. | 123/305 |
| 2006/0016438 | A1 | 1/2006 | Kang | |
| 2006/0196466 | A1 | 9/2006 | Kuo et al. | |
| 2006/0243241 | A1 | 11/2006 | Kuo et al. | |
| 2010/0107605 | A1 | 5/2010 | Brinkman et al. | |
| 2011/0288742 | A1 * | 11/2011 | Wermuth et al. | 701/102 |
| 2013/0184967 | A1 * | 7/2013 | Kang et al. | 701/102 |

* cited by examiner

*Primary Examiner* — Stephen K Cronin
*Assistant Examiner* — Elizabeth Hadley

(57) ABSTRACT

A method for operating an internal combustion engine includes determining an actual combustion heat release during ongoing engine operation, calculating an expected combustion heat release corresponding to engine operation associated with the actual combustion heat release during ongoing engine operation, determining a difference between the actual combustion heat release and the expected combustion heat release, and operating the internal combustion engine in a homogeneous-charge compression-ignition combustion mode to achieve a preferred combustion phasing during each combustion cycle in response to the difference between the actual combustion heat release and the expected combustion heat release.

14 Claims, 6 Drawing Sheets

METHOD AND APPARATUS FOR OPERATING AN INTERNAL COMBUSTION ENGINE IN A HOMOGENEOUS-CHARGE COMPRESSION-IGNITION COMBUSTION MODE

CROSS REFERENCE TO RELATED APPLICATIONS

This application claims the benefit of U.S. Provisional Application No. 61/347,799, filed on May 24, 2010, which is incorporated herein by reference.

TECHNICAL FIELD

This disclosure relates to an internal combustion engine configured to operate in a homogeneous-charge compression-ignition (HCCI) combustion mode.

BACKGROUND

The statements in this section merely provide background information related to the present disclosure and may not constitute prior art.

Known spark-ignition (SI) engines introduce an air/fuel mixture into each cylinder that is compressed in a compression stroke and ignited by a spark plug. Known compression-ignition (CI) engines inject pressurized fuel into a combustion cylinder near top dead center (TDC) of the compression stroke that ignites upon injection. Combustion for both SI engines and CI engines involves premixed or diffusion flames controlled by fluid mechanics.

SI engines may operate in a variety of different combustion modes, including a homogeneous SI combustion mode and a stratified-charge SI combustion mode. SI engines may be configured to operate in a homogeneous-charge compression-ignition (HCCI) combustion mode, also referred to as controlled auto-ignition combustion, under predetermined speed/load operating conditions. The HCCI combustion mode includes a distributed, flameless, auto-ignition combustion process that is controlled by oxidation chemistry. An engine operating in the HCCI combustion mode has a cylinder charge that is preferably homogeneous in composition, temperature, and residual exhaust gases at intake valve closing time. HCCI combustion is a distributed kinetically-controlled combustion process with the engine operating at a dilute air/fuel mixture, i.e., lean of a stoichiometric air/fuel point, with relatively low peak combustion temperatures, resulting in low NOx emissions. The homogeneous air/fuel mixture minimizes occurrences of rich in-cylinder combustion zones that form smoke and particulate emissions.

Engine airflow may be controlled by selectively adjusting position of the throttle valve and opening and closing of intake valves and exhaust valves. On engine systems so equipped, opening and closing of the intake valves and exhaust valves may be adjusted using a variable valve actuation system that includes variable cam phasing and a selectable multi-step valve lift, e.g., multiple-step cam lobes that provide two or more valve lift positions. In contrast to the throttle position change, the change in valve position of the multi-step valve lift mechanism is a discrete step change.

When an engine operates in a HCCI combustion mode, the engine operates at a lean or stoichiometric air/fuel ratio operation with the throttle wide open to minimize engine pumping losses. When the engine operates in the SI combustion mode, the engine operates in stoichiometric air/fuel ratio, with the throttle valve controlled over a range of positions from 0% to 100% of the wide-open position to control intake airflow to achieve the stoichiometric air/fuel ratio.

Combustion during engine operation in the HCCI combustion mode is affected by cylinder charge gas temperature before and during compression prior to ignition and by mixture composition of a cylinder charge. Known engines operating in auto-ignition combustion modes account for variations in ambient and engine operating conditions using calibration tables as part of an overall engine control scheme. Known HCCI engine control schemes include calibrations for controlling engine parameters using input parameters including, e.g., engine load, engine speed and engine coolant temperature. Cylinder charge gas temperatures may be affected by controlling hot gas residuals via engine valve overlap and controlling cold gas residuals via exhaust gas recirculation rate. Cylinder charge gas temperatures may be influenced by engine environment factors, including, e.g., air temperature, humidity, altitude, and fuel parameters, e.g., RVP, energy content, and quality.

Combustion during engine operation in the HCCI combustion mode may be characterized in terms of combustion heat release, which may include combustion timing relative to piston position, i.e., combustion phasing. Combustion phasing may be described in terms of a mass-burn fraction, which indicates a piston crank angle position at which a portion of the cylinder charge is burned. A mass-burn fraction of interest includes a CA50 point, which is a crank angle, preferably relative to TDC at which an accumulated heat release of a combustion charge reaches 50% of a total heat release.— Known control systems control combustion phasing using feedback control algorithms to compensate for a plurality of effects of environmental and ambient parameters on combustion timing and air/fuel ratio.

SUMMARY

A method for operating an internal combustion engine includes determining an actual combustion heat release during ongoing engine operation, calculating an expected combustion heat release corresponding to engine operation associated with the actual combustion heat release during ongoing engine operation, determining a difference between the actual combustion heat release and the expected combustion heat release, and operating the internal combustion engine in a homogeneous-charge compression-ignition combustion mode to achieve a preferred combustion phasing during each combustion cycle in response to the difference between the actual combustion heat release and the expected combustion heat release.

BRIEF DESCRIPTION OF THE DRAWINGS

One or more embodiments will now be described, by way of example, with reference to the accompanying drawings, in which.

DETAILED DESCRIPTION

Figure 1:
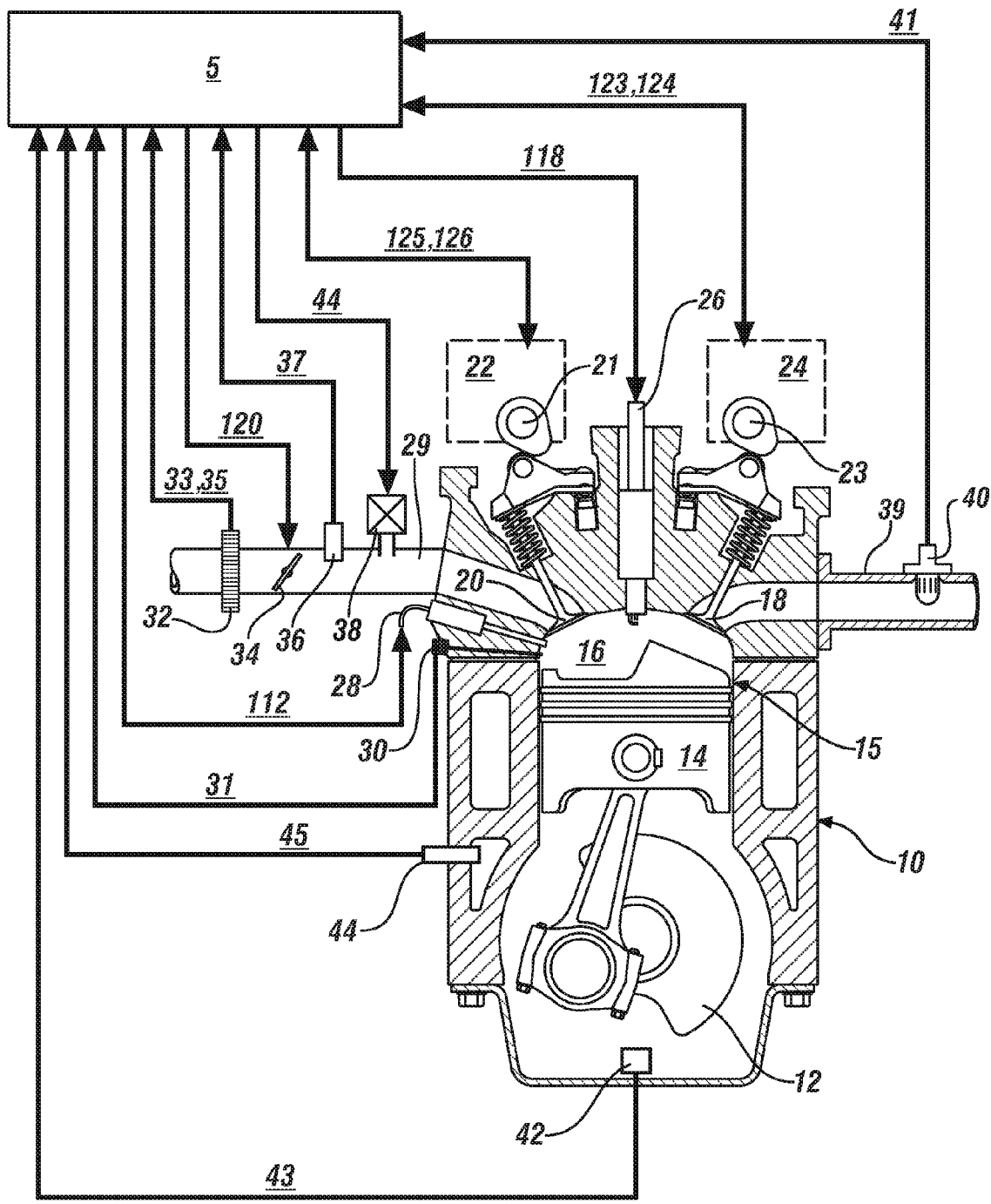
FIG. 1 is a schematic drawing of a spark-ignition internal combustion engine configured to operate in controlled auto-ignition (HCCI) combustion mode and an accompanying control module in accordance with the present disclosure.

Referring now to the drawings, wherein the depictions are for the purpose of illustrating certain exemplary embodiments only and not for the purpose of limiting the same, FIG. 1 is a schematic drawing of an internal combustion engine 10 with an accompanying control module 5 that have been constructed in accordance with an embodiment of this disclosure. The engine 10 is configured to operate in a plurality of combustion modes, including a homogeneous-charge compression-ignition (HCCI) combustion mode and a spark-ignition (SI) combustion mode. The engine 10 operates at a stoichiometric air/fuel ratio and at an air/fuel ratio that is primarily lean of stoichiometry. The disclosure may be applied to various internal combustion engine systems and combustion cycles.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system has airflow ductwork and devices for monitoring and controlling the air flow. The air intake devices preferably include a mass airflow sensor 32 for monitoring mass airflow (MAF) 33 and intake air temperature (IAT) 35. A throttle valve 34 preferably includes an electronically controlled device that is used to control airflow to the engine 10 in response to a control signal 120 from the control module 5. A pressure sensor 36 in the intake manifold 29 is configured to monitor manifold absolute pressure (MAP) 37 and barometric pressure. An external flow passage recirculates exhaust gases from engine exhaust to the intake manifold 29, having a flow control valve referred to as an exhaust gas recirculation (EGR) valve 38. The control module 5 controls mass flow of exhaust gas to the intake manifold 29 by controlling opening of the EGR valve 38 via control signal 44.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 may be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift (VLC) of the intake valve(s) 20 in response to a control signal 125 and variably adjust and control phasing (VCP) of the intake camshaft 21 for each cylinder 15 in response to a control signal 126. The exhaust VCP/VLC device 24 preferably includes a controllable mechanism operative to variably switch and control valve lift (VLC) of the exhaust valve(s) 18 in response to a control signal 123 and variably adjust and control phasing (VCP) of the exhaust camshaft 23 for each cylinder 15 in response to a control signal 124.

The intake and exhaust VCP/VLC devices 22 and 24 each preferably includes a controllable two-step VLC mechanism operative to control magnitude of valve lift, or opening, of the intake and exhaust valve(s) 20 and 18, respectively, to one of two discrete steps. The two discrete steps preferably include a low-lift valve open position (about 4-6 mm in one embodiment) preferably for low speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, in response to the respective control signals 123, 124, 125, and 126.

The engine 10 employs a direct-injection fuel injection system including a plurality of high-pressure fuel injectors 28 each configured to directly inject a mass of fuel into one of the combustion chambers 16 in response to a control signal (INJ_PW) 112 from the control module 5. It is appreciated that the control signal INJ_PW 112 includes a pulsewidth duration, in elapsed time, and an injection timing relative to TDC. The fuel injectors 28 are supplied pressurized fuel from a fuel distribution system.

The engine 10 includes a spark-ignition system by which spark energy may be provided to a spark plug 26 for igniting or assisting in igniting cylinder charges in each of the combustion chambers 16 in response to a control signal (IGN) 118 from the control module 5.

The engine 10 is equipped with various sensing devices for monitoring engine operation, including a crank sensor 42 having output RPM 43 indicative of crankshaft rotational position, i.e., crank angle and speed. A temperature sensor 44 is configured to monitor coolant temperature 45. An in-cylinder combustion sensor 30 is configured to monitor combustion 31. The in-cylinder combustion sensor 30 is configured to monitor combustion and includes a cylinder pressure sensor operative to monitor in-cylinder combustion pressure 31 in one embodiment. An exhaust gas sensor 40 is configured to monitor an exhaust gas parameter 41, e.g., air/fuel ratio (AFR). The combustion pressure 31 and the RPM 43 are monitored by the control module 5 to determine combustion phasing, i.e., timing of combustion pressure relative to the crank angle of the crankshaft 12 for each cylinder 15 for each combustion cycle. It is appreciated that combustion phasing may be determined by other methods. The combustion pressure 31 may be monitored by the control module 5 to determine an indicated mean effective pressure (IMEP) for each cylinder 15 for each combustion cycle. Preferably, the engine 10 and control module 5 are configured to monitor and determine states of IMEP for each of the engine cylinders 15 during each cylinder firing event.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinatorial logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is configured to receive input signals from an operator (e.g., via an accelerator pedal and a brake pedal) to determine an operator torque request, from which an engine torque command is derived.

Determining the effective temperature $T_{EFF}$ includes determining and aggregating engine environment factors in terms of their effect upon combustion phasing, e.g., the magnitude and timing of combustion heat release during each cylinder event. Exemplary engine environment factors may include coolant temperature, engine load history, ambient air humidity, altitude, fuel quality, and combustion chamber deposits. The effects of the engine environment factors may be correlated to cylinder pressure and the combustion phasing, which may be determined from measurements of engine crank angle, cylinder pressure, combustion timing and estimations correlated to or otherwise ascertained from engine operation.

The effective temperature $T_{EFF}$ is preferably used to adjust control states of engine actuators in a feed-forward approach using a single set of calibration tables, wherein each of the calibration tables is preferably arranged as a two-dimensional array corresponding to engine speed and load. This avoids the use of complex calibration tables and the need for multiple term feedback combustion control. The contribution of each parameter on the effective temperature $T_{EFF}$ is determined and the calibration is based upon the effective temperature $T_{EFF}$ instead of a single one of the parameters, e.g., the coolant temperature.

The single integrated thermal state parameter, i.e., the effective temperature $T_{EFF}$ is an aggregation of engine environment factors affecting in-cylinder temperatures. A single state for the effective temperature $T_{EFF}$ may be aggregated using an equation that may be executed during ongoing engine operation. An exemplary equation is:

$$T_{EFF}=T_C+T_{LOAD}+T_{INT}+T_{HUM}+T_{ALT}+T_{FUEL}+T_{DEP} \quad [1]$$

The engine environment factors aggregated to determine the effective temperature $T_{EFF}$ include the following.

$T_C$ which is coolant temperature, $T_{LOAD}$ which is a temperature bias term corresponding to engine load and engine load history, $T_{INT}$ which is a temperature bias term corresponding to intake air temperature, $T_{HUM}$ which is a temperature bias term corresponding to ambient humidity, $T_{ALT}$ which is a temperature bias term corresponding to altitude, $T_{FUEL}$ which is a temperature bias term corresponding to fuel quality, and $T_{DEP}$ which is a temperature bias term corresponding to combustion chamber deposits.

It is appreciated that a value for the effective temperature $T_{EFF}$ may instead be determined by multiplying the temperature bias terms.

Contributions of the various engine environment factors including coolant temperature, engine load, ambient air humidity, altitude, fuel quality, and combustion chamber deposits may be determined during calibration development exercises.

Figure 10:
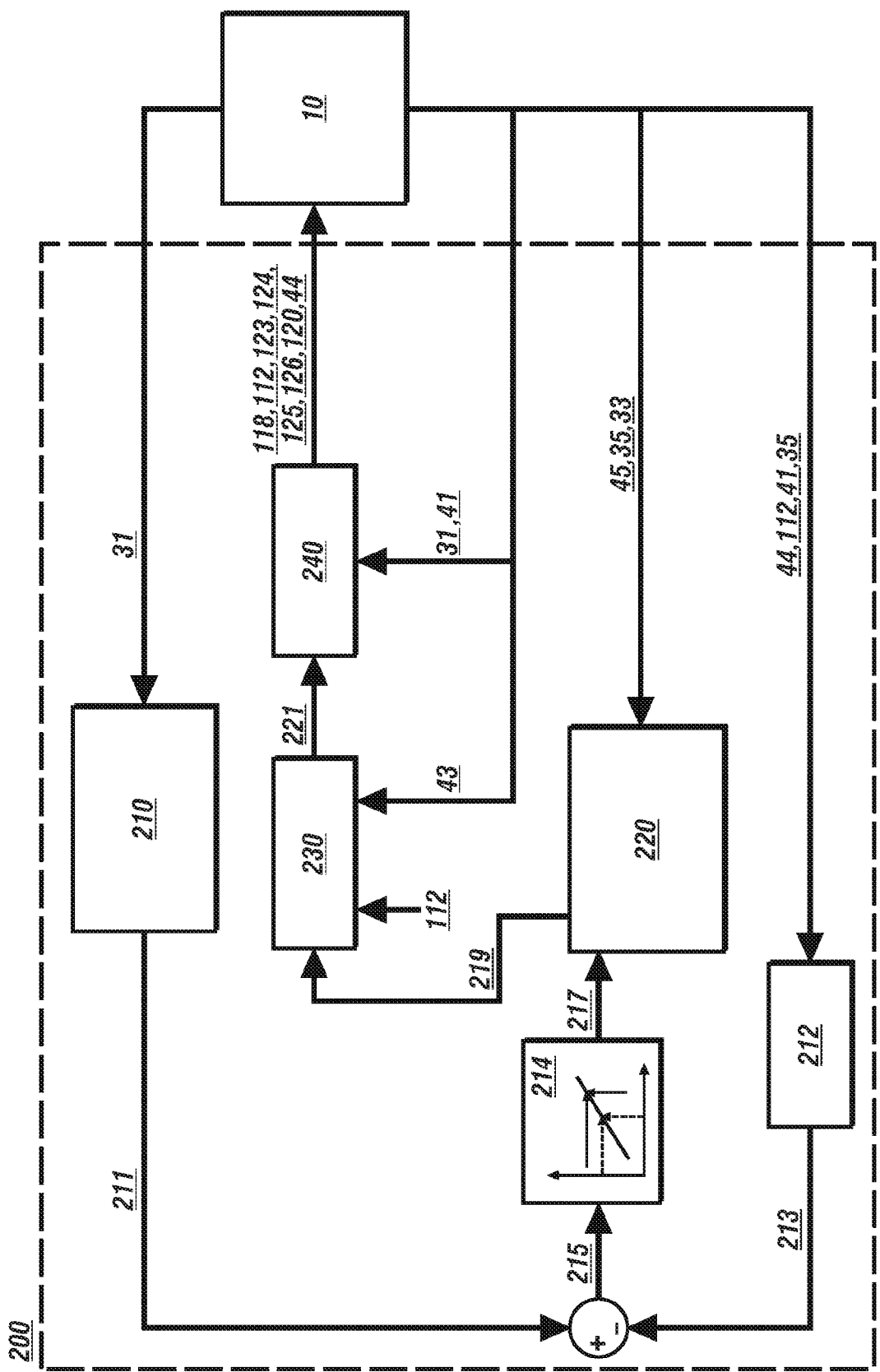
FIG. 10 shows a control scheme for operating an internal combustion engine configured to operate in a HCCI combustion mode in accordance with the present disclosure.

The combustion heat release during engine operation in response to an engine torque command is affected by the single integrated thermal state parameter, i.e., the effective temperature $T_{EFF}$. During ongoing engine operation, the effective temperature $T_{EFF}$ is iteratively determined by measuring or otherwise determining present operating states for each of the engine environment factors and combining them, e.g., as shown with reference to Eq. 1, above. A preferred combustion phasing responsive to the engine torque command may be determined. An engine control scheme, e.g., as described with reference to FIG. 10, is executed to determine states for engine control parameters. The engine control parameters control operation of an embodiment of the internal combustion engine 10 during operation in the HCCI combustion mode to achieve the preferred combustion phasing at the engine operating point while taking into account the engine environment factors indicated by the single integrated thermal state parameter.

Figure 2:
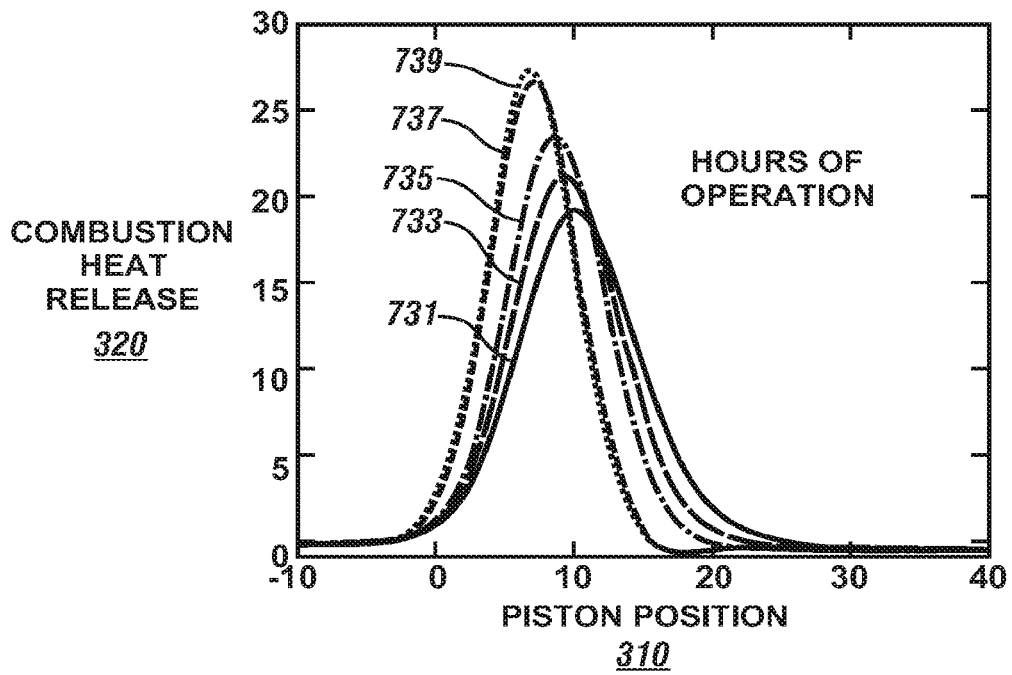
FIG. 2 graphically depicts a rate of combustion heat release plotted against piston position around TDC for engine operation of various durations for an exemplary internal combustion engine operating in HCCI combustion mode in accordance with the disclosure.

FIG. 2 graphically depicts a rate of combustion heat release 320 (J/CA) plotted against piston position around TDC 310 (CA deg aTDC) for engine durations of operation of 1 hour of operation 731, 10 hours of operation 733, 20 hours of operation 735, 30 hours of operation 737, and 40 hours of operation 739 for an exemplary internal combustion engine operating in HCCI combustion mode. The results indicate a change in the rate of combustion heat release including an advance in combustion phasing (movement toward TDC) and an increase in a peak combustion heat release rate with increasing hours of operation. The change in the combustion heat release rate over time of operation corresponds to a change in combustion chamber deposits, thus affecting cylinder charge temperature. The results indicate that engine control schemes need to account for effect of combustion chamber deposits to optimize engine performance during operation in the HCCI combustion mode.

Figure 3:
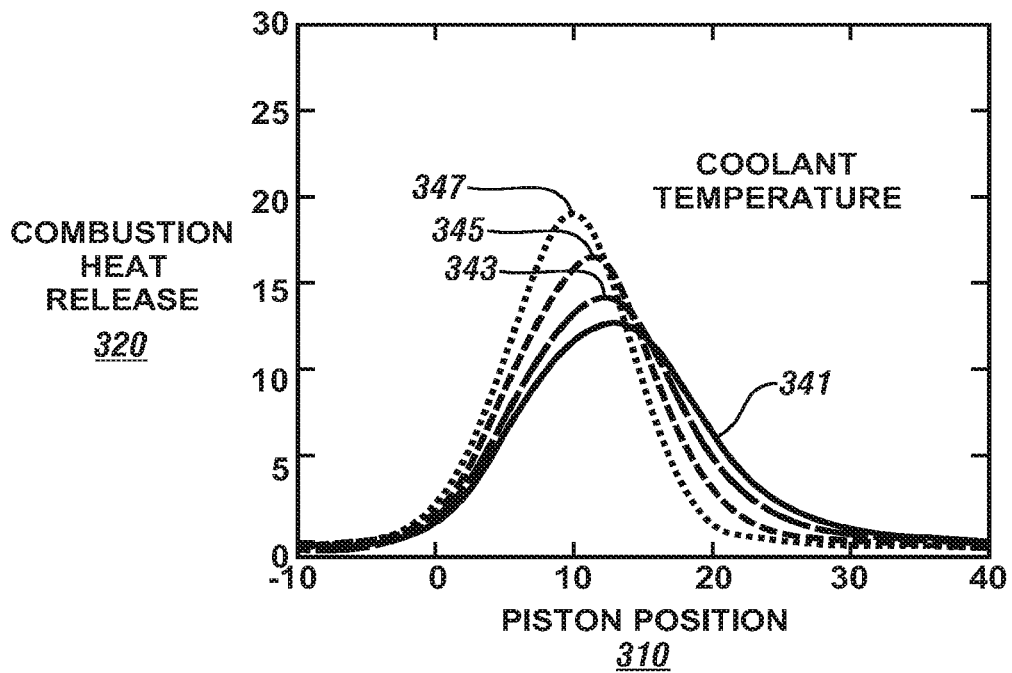
FIG. 3 graphically depicts a rate of combustion heat release plotted against piston position around TDC for a range of coolant temperatures for an exemplary internal combustion engine operating in HCCI combustion mode, in accordance with the disclosure.

FIG. 3 graphically depicts a rate of combustion heat release 320 (J/CA) plotted against piston position around TDC 310 (CA deg aTDC) for a range of coolant temperatures including 80° C. 341, 85° C. 343, 90° C. 345, and 95° C. 347, for an exemplary internal combustion engine operating in HCCI combustion mode, indicating an advance in combustion phasing, i.e., movement toward TDC and increase in peak heat release with increasing coolant temperature. Results shown in FIGS. 2 and 3 indicate that combustion chamber deposits influence the combustion heat release rate in the same way, although not necessarily in the same magnitude, as the coolant temperature.

Figure 4:
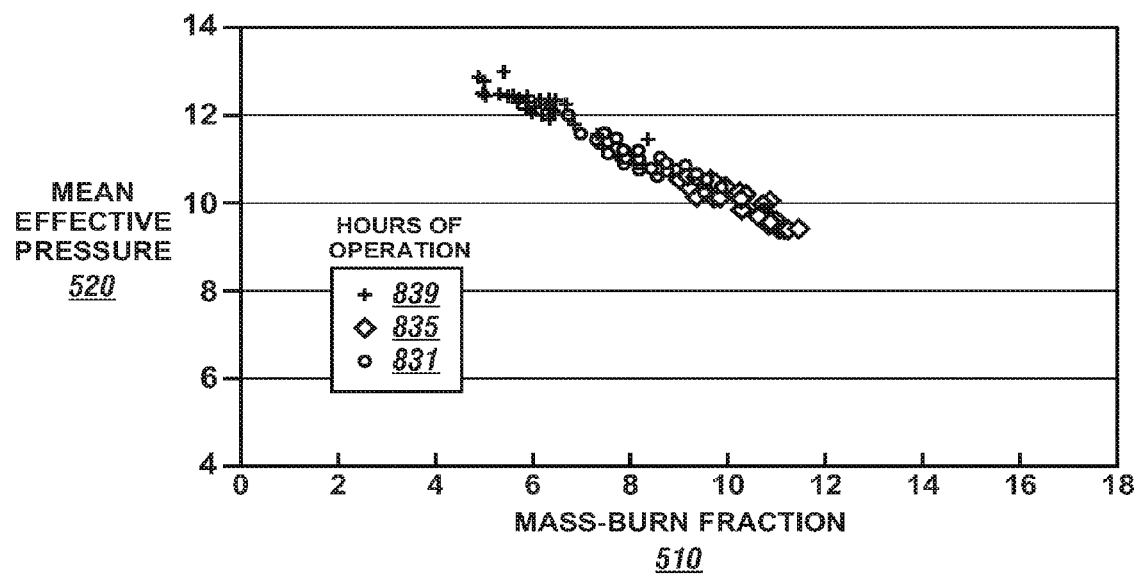
FIG. 4 graphically depicts a ratio of peak cylinder pressure in relation to indicated mean effective pressure (IMEP) plotted in relation to combustion phasing, i.e., CA50 mass-burn fraction points for engine operating states for an exemplary internal combustion engine operating in HCCI combustion mode in accordance with the disclosure.

FIG. 4 graphically depicts a ratio of peak cylinder pressure in relation to indicated mean effective pressure 520 (pressure/pressure) plotted in relation to combustion phasing, i.e., CA50 mass-burn fraction 510 (CA deg aTDC) for engine operating states of 1 hour of operation 835, 20 hours of operation 831, and 40 hours of operation 839 for an exemplary internal combustion engine operating in HCCI combustion mode. The results indicate an advance in combustion phasing, i.e., movement toward TDC and increase in the ratio of the peak cylinder pressure in relation to the indicated mean effective pressure with increasing hours of operation. As previously described with reference to FIG. 2, the results may be associated with combustion chamber deposits.

Figure 5:
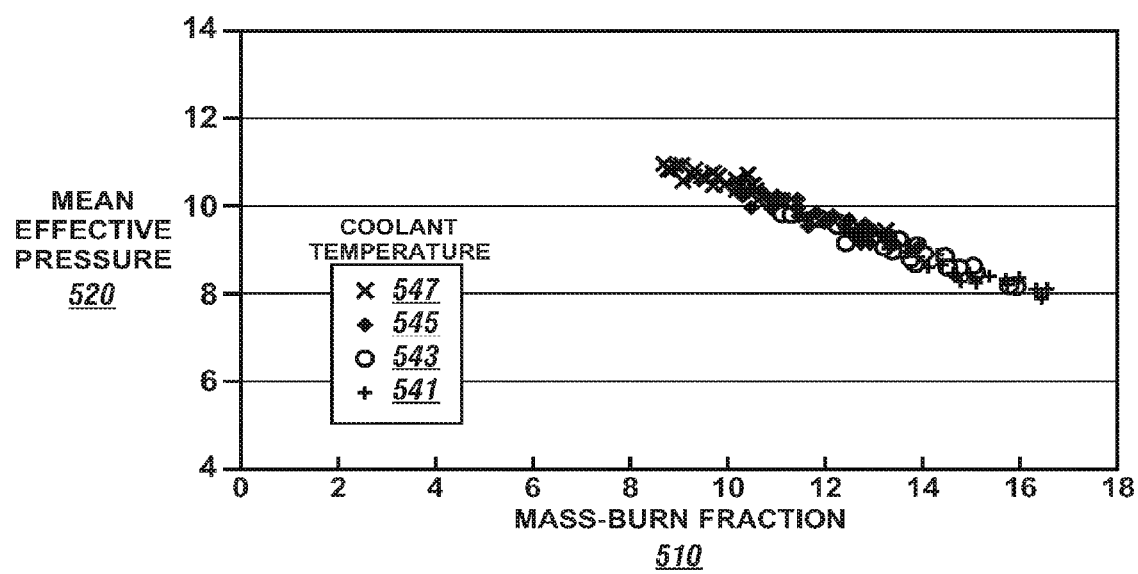
FIG. 5 graphically depicts a ratio of peak cylinder pressure in relation to indicated mean effective pressure (IMEP) plotted in relation to combustion phasing, i.e., CA50 mass-burn fraction points for coolant temperature states for an exemplary internal combustion engine operating in HCCI combustion mode in accordance with the disclosure.

FIG. 5 graphically depicts a ratio of peak cylinder pressure in relation to IMEP 520 plotted in relation to combustion phasing, i.e., CA50 mass-burn fraction 510 (CA deg aTDC) for coolant temperature states including 80° C. 541, 85° C. 543, 90° C. 545, and 95° C. 547, for an exemplary internal combustion engine operating in HCCI combustion mode, indicating an advance in combustion phasing, i.e., movement toward TDC and increase in the ratio of peak cylinder pressure in relation to IMEP with increasing coolant temperature.

The results in FIGS. 4 and 5 indicate that combustion chamber deposits associated with 40 hours of engine operation have an influence on the combustion heat release rate that is equivalent to a change in coolant temperature of 16° C. The hours of engine operation may be directly measured to provide a magnitude of a temperature bias term associated with combustion chamber deposits, i.e., a state for $T_{DEP}$.

Magnitude of combustion chamber deposits may be determined by comparing an actual combustion heat release parameter with an expected combustion heat release parameter, wherein the actual and expected combustion heat release parameters are descriptive of combustion heat release and correlate to magnitude and timing of the combustion heat release. In one embodiment, the expected combustion heat release parameter may be calculated as an average energy release rate (expected AERR), which is defined as an average burning rate of a mass of fuel during a combustion cycle for a cylinder. A combustion process model may be used to determine the expected AERR for an engine speed/load operating point using engine operating parameters including fuel/air equivalence ratio, volumetric efficiency and gas temperature at intake valve closing, all of which may be determined during ongoing engine operation. Combustion process models are known. One exemplary combustion process model to determine the expected AERR is described in commonly assigned U.S. Pat. No. 7,409,285.

An actual combustion heat release parameter for an exemplary engine 10 may be determined using the measured cylinder combustion pressure 31. One exemplary combustion heat release parameter is a measured average energy release rate (measured AERR) that correlates to the monitored cylinder pressure, and is a measure of the magnitude and timing of the combustion heat release during each combustion cycle for a cylinder as indicated by the monitored cylinder pressure.

Figure 6:
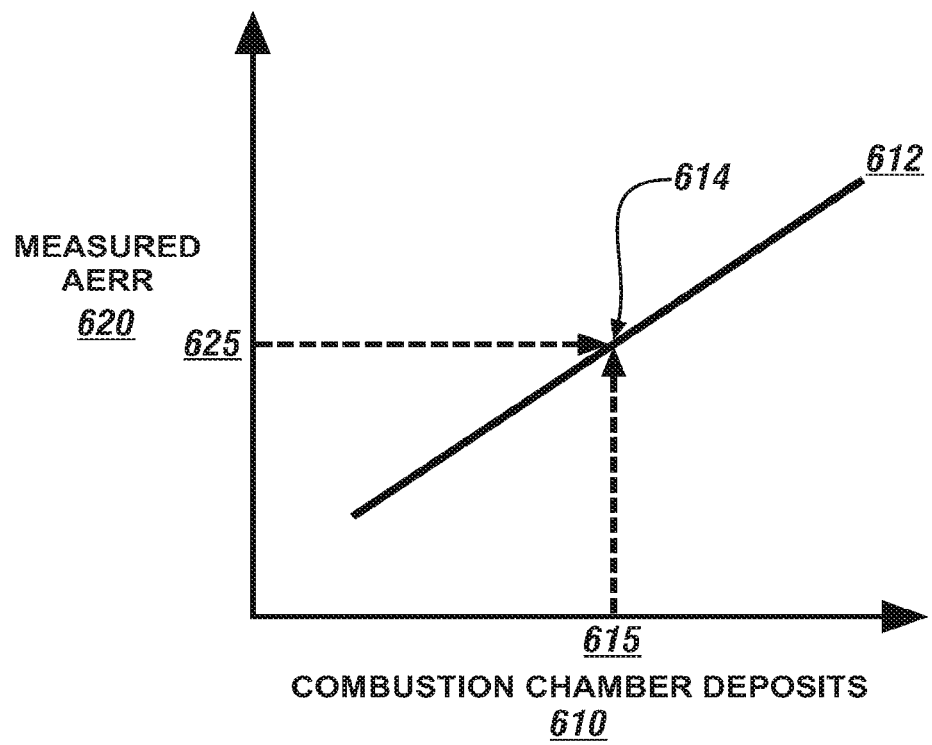
FIG. 6 graphically depicts a measured average energy release rate in relation to thickness of combustion chamber deposits in accordance with the present disclosure.

FIG. 6 graphically depicts data 612 representing combustion heat release in terms of the measured AERR 620 plotted in relation to thickness of combustion chamber deposits 610 for an exemplary engine system operating in an HCCI combustion mode. The data 612 indicates that the measured AERR increases with increasing thickness of combustion chamber deposits. The data 612 includes a datapoint 614 having a selected thickness 615 of combustion chamber deposits and a corresponding measured AERR 625. The results indicate that when the measured AERR is greater that an expected value for a known magnitude of the combustion chamber deposits, the magnitude of the combustion chamber deposits is greater than expected. When the measured AERR is less that an expected value for a known magnitude of the combustion chamber deposits, the magnitude of the combustion chamber deposits is less than expected.

Figure 7:
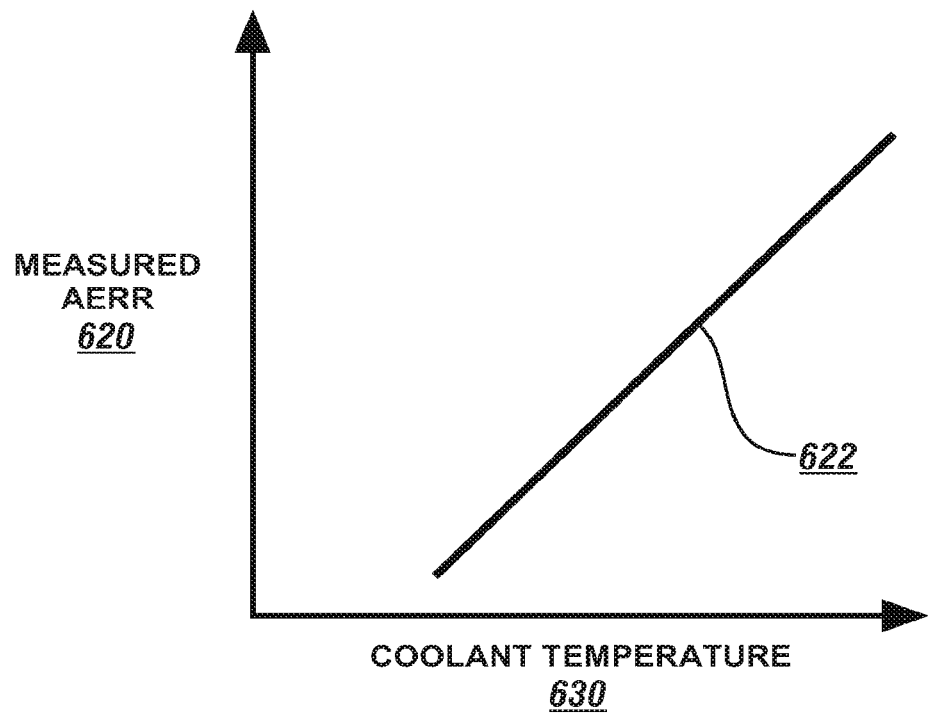
FIG. 7 graphically depicts a measured average energy release rate in relation to coolant temperature for an exemplary engine system operating in an HCCI combustion mode in accordance with the present disclosure.

FIG. 7 graphically depicts date 622 representing the measured AERR 620 plotted in relation to coolant temperature 630 for an exemplary engine system operating in an HCCI combustion mode. The data depicted with reference to FIGS. 6 and 7 indicate that magnitude of combustion chamber deposits influences the measured AERR in the same way, although not necessarily in the same magnitude, as the coolant temperature.

Figure 8:
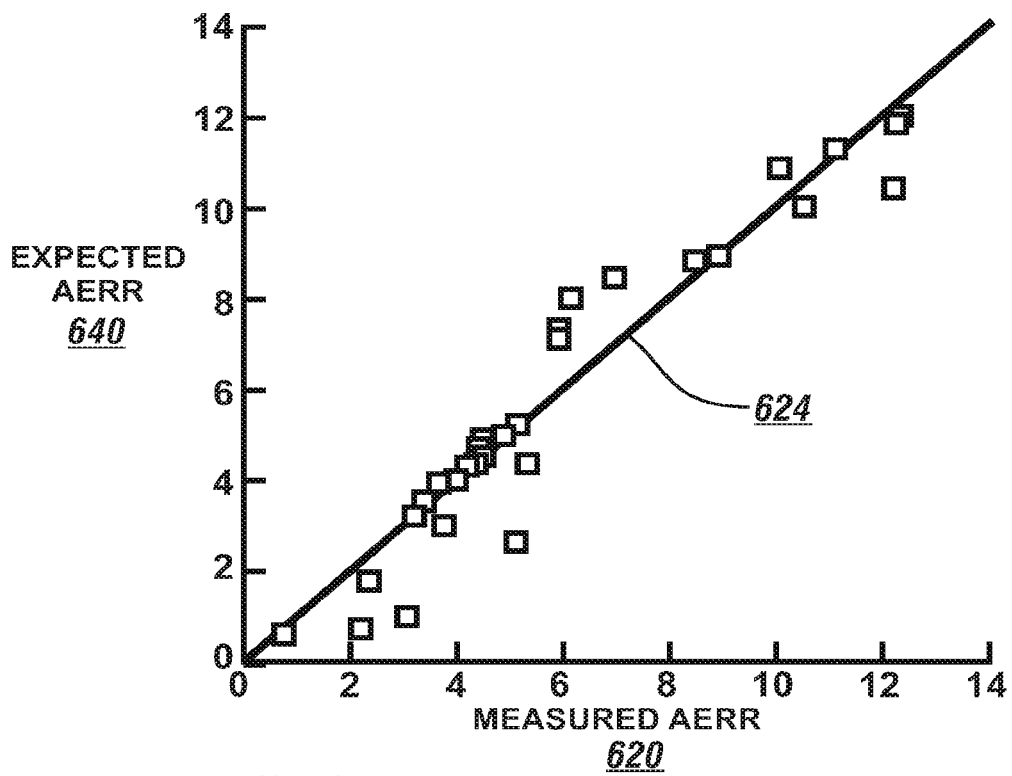
FIG. 8 graphically depicts a correspondence between a measured average energy release rate and a calculated or expected average energy release rate in accordance with the present disclosure.

FIG. 8 graphically shows measured AERR 620 on the x-axis and expected AERR 640 on the y-axis, and depicts a plurality of data points indicating measured AERR and corresponding expected AERR for a plurality of engine operating points, including a line of correlation 624. The expected AERR 640 is determined as described herein using a combustion process model. The measured AERR is determined using experimental data derived with a known state of combustion chamber deposits and is compared with a corresponding expected AERR for a plurality of engine operating points. Thus, for a known state of combustion chamber deposits a deviation between the expected AERR and the measured AERR may be used to characterize the state of combustion chamber deposits in relation to the known state. When the measured AERR is greater than the expected AERR and other environmental parameters have been accounted for, the actual magnitude of the combustion chamber deposits is greater than the magnitude of the combustion chamber deposits for which the model was developed and vice versa. The functional relationship between a deviation in the measured AERR and magnitude of the combustion chamber deposits may be determined using experiments on an exemplary engine with various known states of combustion chamber deposits. The measured AERR indicating actual combustion heat release parameter may be determined using the measured cylinder combustion pressure 31. The measured AERR is compared to the expected AERR to determine an AERR deviation, which correlates to the magnitude of the combustion chamber deposits.

Operation of an embodiment of the exemplary engine 10 in the HCCI combustion mode may be adapted to respond to changing states of combustion chamber deposits using a functional relationship between the AERR deviation and a thermal state parameter, e.g., coolant temperature.

Figure 9:
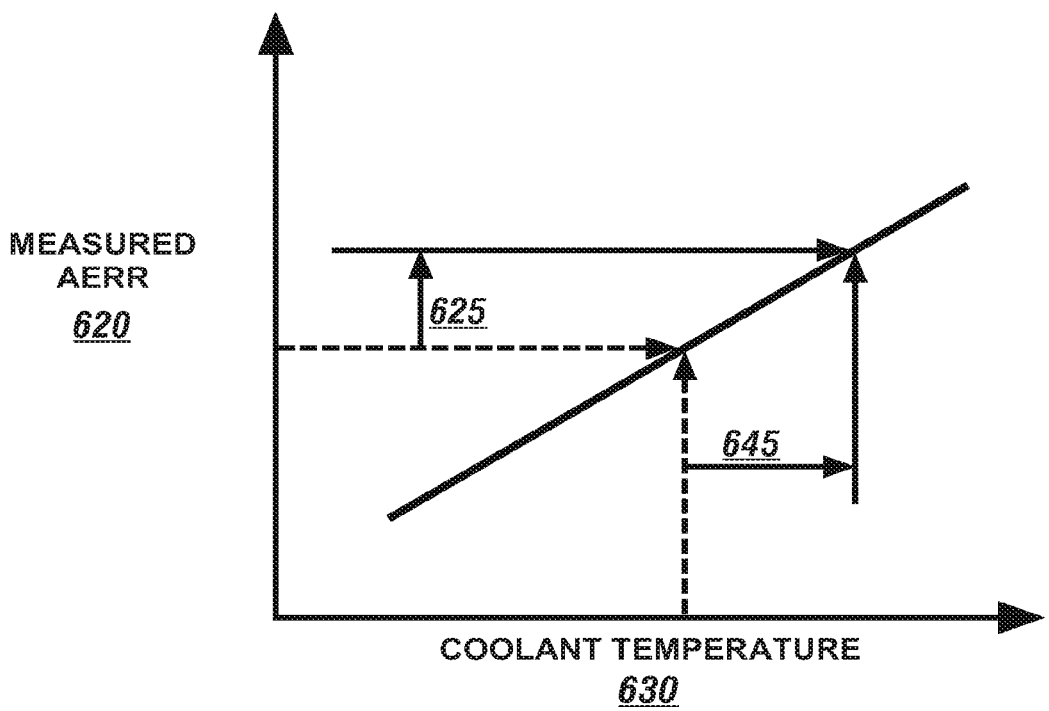
FIG. 9 graphically shows a relationship between a thermal state parameter, e.g., coolant temperature and a measured average energy release rate for an exemplary engine operating in the HCCI combustion mode in accordance with the disclosure.

FIG. 9 graphically shows a relationship between a thermal state parameter 630, e.g., coolant temperature and measured AERR 620 for an exemplary engine operating in the HCCI combustion mode. The relationship may be used to determine a deviation in the coolant temperature 645 that correlates to the AERR deviation 625.

The results depicted in FIGS. 6 and 9 illustrate that combustion chamber deposits may be correlated to the thermal state parameter 630, e.g., coolant temperature using monitored parameters associated with combustion performance and combustion phasing. In the same way the AERR deviation may be directly correlated to a deviation in the coolant temperature without determining a magnitude of deposit coverage as an intermediate step. Thus a change in combustion chamber deposits may affect engine operation in the same manner as a change in coolant temperature.

An engine control scheme may be employed to use the effective temperature $T_{EFF}$ described with reference to EQ. 1 for engine calibration and control, including characterizing combustion chamber deposits and adapting engine operation in response, as described herein.

FIG. 10 schematically shows an engine control scheme 200 for controlling and operating an exemplary embodiment of the internal combustion engine 10 in the HCCI combustion mode, including compensating for changes in the combustion chamber deposits as they affect combustion heat release, which may be indicated by a measured AERR and a corresponding expected AERR. Compensating for changes in the combustion chamber deposits as they affect the combustion heat release includes adjusting an effective temperature $T_{EFF}$ in response to changes in the combustion chamber deposits and controlling various engine actuators in response to the effective temperature $T_{EFF}$. The engine control scheme 200 is iteratively executed during ongoing engine operation to control engine operation in the HCCI combustion mode.

The engine control scheme 200 preferably includes algorithmic code and calibration tables stored in one of the memory devices of the engine control module 5 for execution therein. The engine control scheme 200 monitors a plurality of operator inputs (including, e.g., an operator torque request), ambient conditions (including, e.g., intake air temperature 35, humidity, altitude), engine parameters (including, e.g., RPM 43, MAP 37, MAF 33, IAT 35, and INJ_PW 112) and combustion parameters (including, e.g., combustion pressure 31 and AFR 41). The engine control scheme 200 executes algorithms to determine preferred control states for various actuators in response to the engine torque command and to achieve a preferred combustion phasing during operation in the homogeneous-charge compression-ignition combustion mode. The monitored combustion parameters, including combustion pressure 31 and AFR 41 are used to calculate combustion phasing and combustion heat release. The combustion phasing is preferably the CA50 mass-burn fraction point. The aforementioned operator inputs, ambient conditions, engine parameters, and combustion parameters are monitored.

Cylinder pressure 31 is used to determine a combustion heat release parameter, e.g., the measured AERR 211, in real-time 210.

A predicted combustion heat release parameter, e.g., expected AERR 213, is determined and corresponds to present engine parameters of engine load, intake air temperature, EGR mass flowrate, fuel mass, and other parameters used to determine the engine operating parameters including fuel/air equivalence ratio, volumetric efficiency and gas temperature at intake valve closing as previously described 212.

A difference between the expected AERR 213 and the measured AERR 211 may be determined, which is the aforementioned AERR deviation 215. A calibrated relationship 214 between AERR deviation and a deviation in the coolant temperature, e.g., as described with reference to FIG. 9, is used to determine a temperature bias term $T_{DEP}$ 217 corresponding to combustion chamber deposits that correlates to the AERR deviation 215. The temperature bias term $T_{DEP}$ 217 is incorporated with other temperature bias terms to determine an effective temperature $T_{EFF}$ 219, all of which is described with reference to EQ. 1 220. The effective temperature $T_{EFF}$ 219 preferably accounts for the engine environment factors that influence HCCI engine operation including combustion timing and combustion heat release as previously described.

An engine calibration scheme 230 determines an engine operating point corresponding to the engine speed 43 and the engine torque command, e.g., as may be indicated by the commanded injected mass of fuel INJ_PW 112. The engine calibration scheme 230 determines a preferred combustion phasing 221 that accounts for the engine environment factors indicated by the effective temperature $T_{EFF}$ 219.

A combustion controller 240 controls operation of the engine 10 by determining preferred commands for various engine actuators in response to the engine torque command as indicated by INJ_PW 112 that achieves the preferred combustion phasing 221 at the engine operating point.

The combustion controller 240 includes one or more control schemes that generate preferred commands for the various engine actuators in response to the inputs from the calibration scheme 230 and feedback from operating the engine 10 in the HCCI combustion mode. Engine feedback includes monitored engine parameters associated with combustion performance, including combustion pressure 31 and engine air/fuel ratio 41. The preferred commands for the various engine actuators include EGR 44, ETC 120, INJ_PW 112, intake VCP/VLC 125/126 and exhaust VCP/VLC 123/124. The preferred engine operating parameters include, e.g., RPM 43, MAP 37, MAF 33, and INJ_PW 112 and the effective temperature $T_{EFF}$. An engine operating point is determined based upon the engine operating states including speed and load and the effective temperature $T_{EFF}$. A specific feed-forward control state for each of the engine actuators may be determined based upon the engine operating states and the engine power history. The control states for each of the engine actuators include actuator-appropriate command signals to control operation of the actuators to achieve a target engine operation as indicated by the engine operating point and the monitored engine parameters associated with combustion performance, including the combustion pressure 31 and AFR 41. The feed-forward control states for the engine actuators may be subjected to rate-limiters. A feedback control scheme may be used to monitor the aforementioned engine operating states and the monitored engine parameters to determine adjustments for the actuator commands of EGR 44, ETC 120, INJ_PW 112, intake VCP/VLC 125/126 and exhaust VCP/VLC 123/124 using known feedback control strategies. The engine 10 is controlled using the feed-forward control states for the engine actuators adjusted using the feedback control scheme to achieve the preferred combustion phasing while taking into account the engine environment factors of the single integrated thermal state parameter.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating an internal combustion engine, the method comprising:
   determining an actual combustion heat release during ongoing engine operation;
   calculating an expected combustion heat release corresponding to engine operation associated with the actual combustion heat release during ongoing engine operation;
   determining a difference between the actual combustion heat release and the expected combustion heat release, comprising:
      determining a combustion heat release deviation corresponding to the difference between the actual combustion heat release and the expected combustion heat release, and
      determining a deviation in an engine coolant temperature associated with the combustion heat release deviation; and
   operating the internal combustion engine in a homogeneous-charge compression-ignition combustion mode to achieve a preferred combustion phasing during each combustion cycle in response to engine coolant temperature and the deviation in the engine coolant temperature associated with the combustion heat release deviation.

2. The method of claim 1, wherein determining the actual combustion heat release comprises determining a combustion heat release for each cylinder correlated to in-cylinder combustion pressure measured during each combustion cycle.

3. The method of claim 2, wherein determining the combustion heat release for each cylinder comprises determining an average energy release rate corresponding to in-cylinder combustion pressure during each combustion cycle.

4. The method of claim 1, wherein calculating the expected combustion heat release comprises calculating an average energy release rate corresponding to a fuel/air equivalence ratio, a volumetric efficiency and a gas temperature at intake valve closing for an engine operating point corresponding to the ongoing engine operation.

5. The method of claim 4, wherein calculating an average energy release rate comprises executing a combustion process model to calculate the average energy release rate for the engine operating point corresponding to the ongoing engine operation.

6. The method of claim 1, further comprising:
   determining a magnitude of combustion chamber deposits corresponding to the difference between the actual combustion heat release and the expected combustion heat release; and
   wherein operating the internal combustion engine in the homogeneous-charge compression-ignition combustion mode to achieve the preferred combustion phasing during each combustion cycle in response to the engine coolant temperature and the deviation in the engine coolant temperature associated with the combustion heat release deviation comprises operating the internal combustion engine in the homogeneous-charge compression-ignition combustion mode to achieve the preferred combustion phasing during each combustion cycle in response to the magnitude of combustion chamber deposits corresponding to the difference between the actual combustion heat release and the expected combustion heat release.

7. A method for operating an internal combustion engine, the method comprising:
   determining a first parameter corresponding to an actual combustion heat release at an engine operating point;
   determining a second parameter corresponding to an expected combustion heat release, the expected combustion heat release correlated to engine operating parameters at the engine operating point;
   determining a magnitude of combustion chamber deposits corresponding to a difference between the first and second parameters, comprising:
      determining a deviation in an engine coolant temperature associated with a combustion heat release deviation corresponding to the difference between the first parameter and the second parameter, and
      determining the magnitude of combustion chamber deposits corresponding to the deviation in engine coolant temperature; and
   operating the internal combustion engine in the homogeneous-charge compression-ignition combustion mode to achieve a preferred combustion phasing at the engine operating point in response to the magnitude of combustion chamber deposits.

8. The method of claim 7, wherein determining the first parameter comprises determining a combustion heat release for each cylinder correlated to in-cylinder combustion pressure measured at the engine operating point.

9. The method of claim 8, wherein determining the combustion heat release for each cylinder comprises determining an average energy release rate corresponding to in-cylinder combustion pressure during each combustion cycle.

10. The method of claim 7, wherein determining the second parameter comprises calculating an average energy release rate corresponding to a fuel/air equivalence ratio, a volumetric efficiency and gas temperature at intake valve closing for the engine operating point.

11. The method of claim 10, wherein calculating the average energy release rate comprises executing a combustion process model to calculate the average energy release rate for the engine operating point.

12. A method for operating an internal combustion engine, the method comprising:
   determining an actual combustion heat release for engine operation at an engine operating point;
   determining an expected combustion heat release, the expected combustion heat release correlated to engine operating parameters at the engine operating point;
   determining an adjustment to an integrated thermal state parameter, said adjustment corresponding to a difference between the actual and the expected combustion heat releases; and
   operating the internal combustion engine in a homogeneous-charge compression-ignition combustion mode using the adjustment to the integrated thermal state parameter corresponding to the difference between the actual and the expected combustion heat releases.

13. The method of claim 1, wherein operating the internal combustion engine in the homogeneous-charge compression-ignition combustion mode to achieve the preferred combustion phasing during each combustion cycle in response to engine coolant temperature and the deviation in the engine coolant temperature associated with the combustion heat release deviation comprises:

determining an integrated thermal state parameter in accordance with the following relationship:

$$T_{EFF} = T_C + T_{LOAD} + T_{INT} + T_{HUM} + T_{ALT} + T_{FUEL} + T_{DEP}$$

wherein
$T_{EFF}$ is the integrated thermal state parameter,
$T_C$ is the engine coolant temperature,
$T_{LOAD}$ is a temperature bias term corresponding to engine load and engine load history,
$T_{INT}$ is a temperature bias term corresponding to intake air temperature,
$T_{HUM}$ is a temperature bias term corresponding to ambient humidity,
$T_{ALT}$ is a temperature bias term corresponding to altitude,
$T_{FUEL}$ is a temperature bias term corresponding to fuel quality, and
$T_{DEP}$ is the deviation in the engine coolant temperature associated with the combustion heat release deviation; and operating the internal combustion engine in the homogeneous-charge compression-ignition combustion mode to achieve the preferred combustion phasing during each combustion cycle in response to the integrated thermal state parameter.

14. The method of claim 12, wherein operating the internal combustion engine in a homogeneous-charge compression-ignition combustion mode using the adjustment to the integrated thermal state parameter comprises:

determining an integrated thermal state parameter in accordance with the following relationship:

$$T_{EFF} = T_C + T_{LOAD} + T_{INT} + T_{HUM} + T_{ALT} + T_{FUEL} + T_{DEP}$$

wherein
$T_{EFF}$ is the integrated thermal state parameter,
$T_C$ is the engine coolant temperature,
$T_{LOAD}$ is a temperature bias term corresponding to engine load and engine load history,
$T_{INT}$ is a temperature bias term corresponding to intake air temperature,
$T_{HUM}$ is a temperature bias term corresponding to ambient humidity,
$T_{ALT}$ is a temperature bias term corresponding to altitude,
$T_{FUEL}$ is a temperature bias term corresponding to fuel quality, and
$T_{DEP}$ is the deviation in the engine coolant temperature associated with the combustion heat release deviation; and operating the internal combustion engine in a homogeneous-charge compression-ignition combustion mode using the adjustment to the integrated thermal state parameter corresponding to the difference between the actual and the expected combustion heat releases.

* * * * *